United States Patent [19]
Komm

[11] Patent Number: 5,914,579
[45] Date of Patent: Jun. 22, 1999

[54] DIRECT CURRENT COMMAND GENERATION FOR A STEPPER MOTOR DRIVE

[75] Inventor: William Komm, Weatogue, Conn.

[73] Assignee: Dana Corporation, Toledo, Ohio

[21] Appl. No.: 08/942,937

[22] Filed: Oct. 2, 1997

[51] Int. Cl.⁶ .................................................. H02P 8/22
[52] U.S. Cl. ........................................................ 318/696
[58] Field of Search .................................... 318/685, 696, 318/254, 700, 701

[56] References Cited

U.S. PATENT DOCUMENTS

| | | | |
|---|---|---|---|
| 4,250,544 | 2/1981 | Alley | 318/138 X |
| 4,353,019 | 10/1982 | Sweeney, Jr. | 318/594 |
| 4,518,907 | 5/1985 | Giguere | 318/696 |
| 4,630,210 | 12/1986 | Salazar et al. | 318/696 X |
| 4,642,536 | 2/1987 | Boyd, Jr. et al. | 318/254 |
| 4,683,408 | 7/1987 | Inoue et al. | 318/696 |
| 4,868,477 | 9/1989 | Anderson et al. | 318/696 |
| 5,187,417 | 2/1993 | Minnich et al. | 318/254 |
| 5,198,741 | 3/1993 | Shinada et al. | 318/696 |
| 5,252,903 | 10/1993 | Maruyama | 318/696 |
| 5,272,424 | 12/1993 | Lee | 318/560 |
| 5,359,271 | 10/1994 | Husher | 318/696 |
| 5,420,492 | 5/1995 | Sood et al. | 318/809 |
| 5,475,289 | 12/1995 | McLaughlin et al. | 318/432 |
| 5,640,075 | 6/1997 | Brasseur et al. | 318/685 |

*Primary Examiner*—Bentsu Ro
*Attorney, Agent, or Firm*—Dykema Gossett PLLC

[57] ABSTRACT

A system for controlling a stepper motor is disclosed that includes a microprocessor for directly generating current command signals. The microprocessor is of the type having memory wherein the memory includes two transfer tables. The microprocessor, in accordance with software-selectable current magnitude parameter values and microstepping parameter values, determines a sequence of digital words to populate a first one of the tables. The stepper motor is a two-phase motor and the digital words correspond to the phase current commands are generated by the microprocessor using sine, and cosine law function tables. A DMA (Direct Memory Access) controller in the microprocessor outputs the populated transfer table to a drive circuit to energize the stepper motor while the main control software executing in the microprocessor populates the second-transfer table. Once the first transfer table has been completely output to the drive circuit, the roles of the transfer tables are reversed and the process is repeated.

14 Claims, 3 Drawing Sheets

DIRECT CURRENT COMMAND GENERATION FOR A STEPPER MOTOR DRIVE

BACKGROUND OF THE INVENTION

1. Technical Field

This invention relates to the control of stepper motors, and, more particularly, to a control circuit for directly generating drive current command signals for a stepper motor drive.

2. Discussion of the Related Art

Stepper motors are used in a wide variety of applications due to their low cost, ruggedness, simplicity of construction, and wide acceptance, among other factors. A common type of stepper motor includes a permanent magnet-type rotor, and a stator having a body portion with inwardly extending teeth. Coils are wound on stator poles which are connected together to form motor phases. The art is literally replete with variations of this type of stepper motor. For example, a common configuration is a two-phase, 200-step per revolution (i.e., 1.8° mechanical per step) stepper motor. In a non-microstepping mode of operation, current in any given motor phase in any given time is switched either fully on or fully off. It is known, however, to employ a "microstepping" mode of operation, wherein the magnitudes of the currents in the various motor phases are adjusted in accordance with a pre-determined function. For example, in a stepper motor having two phases, a drive circuit may cause electrical current to flow through the stator windings (phases) in accordance with the sine/cosine law.

One approach taken in the art to generate current command signals applied to the drive circuit is to first generate a desired velocity signal (i.e., rotational change of rotor per unit time), and then further process the desired velocity signal to obtain the current command signals. The structure for accomplishing this under this approach may include means for generating a desired velocity signal, a pulse generator, an up down counter, ROM's containing sine and cosine data, and digital-to-analog (D/A) converters. The pulse generator, up/down counter, ROM's, and D/A's are all external to the desired velocity generating means. The velocity signal may be a digital word representing the number of pulses to output over the next pre-determined time period. The pulse generator receives the velocity signal and then uniformly outputs the desired number of pulses over the next pre-determined time interval. The pulse generator's output is coupled to the counter, which then either counts up or down depending on the state of a clockwise/counterclockwise (CW/CCW) direction line (generated by a control). The counter's output defines an address applied to the ROM's. The output of the ROM's is then applied to the D/A's, whose outputs define the current command signals for each phase.

A problem with the foregoing approach is that several hardware components must be used, which increase the cost and size of the control device (commonly referred to as an indexer). In addition, the magnitude of the current commands, the number of steps per motor revolution, as well as other parameters are difficult to vary, being commonly adjusted by way of dip switches.

Accordingly, there is a need to provide an improved stepper motor control circuit that minimizes or eliminates one or more of the problems as set forth above.

SUMMARY OF THE INVENTION

It is an object of the present invention to reduce the number of components in a stepper motor control circuit, and thus also the cost and size of the same. In addition, it is a further object of the present invention to improve the ease with which operating parameters, such as the number of steps per motor revolution, and current command settings, may be selected.

Preferably, the control method is implemented in software, and such parameters as current levels and pulses per revolution may be set using software commands, thereby eliminating the need for dip switches or the like. This approach thus saves money as well as test time, relative to conventional approaches.

To achieve these and other objects, and in accordance with the present invention, a method and apparatus for controlling a stepper motor is provided. In a preferred embodiment, the method includes several basic steps. The first step involves generating a first velocity signal indicative of a desired change in a rotational position of the motor per unit time. Next, dividing the change in the rotational position into a first pre-determined number of increments. The third step involves generating a first current value signal using the first pre-determined number of increments and at least one function table. Next, storing the first current value signal in a first transfer table. The next step involves generating a second velocity signal for the next predetermined period of time. The next step involves dividing a change in rotational position of the motor associated with the second velocity signal into a second pre-determined number of increments. The next step involves generating a second current value signal using the second pre-determined number of increments and the function table. Finally, storing the second current value signal in a second transfer table. Importantly, the step of generating the second current value signal and storing it in the second transfer table occurs while the first current value signal is retrieved from the first transfer table and is used to generate excitation signals that are applied to the motor windings. The foregoing is implemented, in a constructed embodiment, by programming a microprocessor having direct memory access (DMA) capabilities to thereby eliminate a number of discrete hardware components. Particularly, in the constructed embodiment, the DMA controller transfers the first current value signal to generate the excitation signals while the microprocessor core calculates the second current value signal.

Other objects, features and advantages of the present invention will become apparent to one skilled in the art from the following detailed description and accompanying drawings illustrating features of this invention by way of example, but not by way of limitation.

DETAILED DESCRIPTION OF THE PREFERRED EMBODIMENTS

Figure 1:
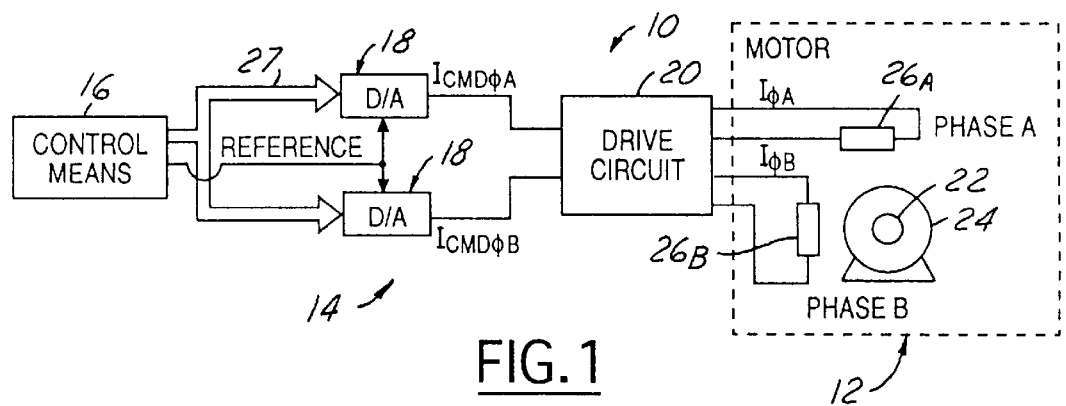
FIG. 1 is a simplified, schematic and block diagram view of an improved stepper motor system according to the invention.

Referring now to the drawings wherein like reference numerals are used to identify identical components in the various views, FIG. 1 shows a motor system 10 in accordance with the present invention. System 10 includes a digital motor, such as two-phase stepper motor 12, and means or circuit 14 for energizing the motor phases of motor 12 in accordance with pre-determined criteria. Although the present invention will be described in connection with a preferred, two-phase stepper motor embodiment, it should be appreciated that the present invention is not so limited, and may be profitably employed to electric motors having three or more phases.

Motor 12 may comprise one of a plurality of conventional stepper motor configurations known to one of ordinary skill in the art. In a constructed embodiment, a two-phase, permanent magnet rotor, 200-step per revolution configuration was used. However, it should be appreciated that the number of motor phases, the number of full steps per revolution, etc. are exemplary only, and not limiting in nature. Motor 12 is diagrammatically illustrated in FIG. 1, and includes a rotor portion 22, a stator portion 24, and windings $26_A$ and $26_B$ defining motor phase A and motor phase B, respectively. Energizing means 14 is configured to energize windings $26_A$, and $26_B$ so that phase currents $I_{\phi A}$, and $I_{\phi B}$, respectively flow therethrough. It should be appreciated, due to the conventional construction of motor 12, that rotor 22 may include a plurality of radially, outwardly extending poles, while stator 24 may include a plurality of radially inwardly extending poles (which may have teeth formed on the ends thereof) upon which windings $26_A$, and $26_B$ are wound. The tips of the stator poles define a central bore sized to accommodate rotor 22. In all respects, motor 12 is well-known and conventional.

Energizing means 14 includes control means 16, a plurality of digital-to-analog (D/A) converting devices 18, and a drive circuit 20. Control means 16 is configured to directly generate a pair of digital words (the current value signals 27) corresponding to the desired current magnitude to flow through the motor phases A and B. In a preferred embodiment, control means 16 outputs a 16-bit word comprising two 8-bit words, one 8-bit word for each phase A and B. The 16-bit digital word is updated by control means 16 at a predetermined frequency. For purposes of illustration only, in a constructed embodiment, control means 16 updates the 16-bit digital word 64 times every two milliseconds. In an alternate embodiment, control means 16 updates the 16-bit digital word 48 times every two milliseconds. It should be appreciated that the number of microsteps per revolution is selectable and may be varied and still remain within the scope of the present invention. In addition, it should be further appreciated that the selection of the number of microsteps/revolution may be influenced by the type of drive circuit 20 used in system 10, the particular configuration of motor 12, as well as the instantaneous values of various operating parameters of motor 12 (e.g., speed, acceleration, etc.). In a preferred embodiment, control means 16 comprises a microprocessor pre-programed in accordance with the present invention. In a constructed embodiment, a commercially available component Hitachi model H8/3003 having on-chip RAM, ROM, a processing core, as well as an on-chip direct memory access (DMA) controller (DMAC) has been found to operate satisfactorily in carrying out the invention. Of course, other devices known to those in the art, and equivalent thereto, may be readily substituted therefor and remain within the scope of the present invention.

Digital-to-analog conversion (D/A) devices 18 are configured to receive, respectively, the 8-bit digital words (the current value signals 27) corresponding to the desired phase current levels. D/A's 18 also each receive a reference signal REFERENCE, which sets the full scale of the current command signals $I_{CMD\phi A}$ and $I_{CMD\phi B}$. D/A's 18 then generate, in response thereto, a pair of "analog" current command signals $I_{CMD\phi A}$, and $I_{CMD\phi B}$, respectively. The current command signals, of course, as should be appreciated by those of ordinary skill in the art, are comprised of a series of small steps.

Drive circuit 20 is conventional, and well-known in the art, and is configured to generate excitation signals for phase A and phase B of motor 12 using the current command signals $I_{CMD\phi A}$ and $I_{CMD\phi B}$, to thereby cause phase currents $I_{\phi A}$, and $I_{\phi B}$ to flow through coils $26_A$ and $26_B$, respectively. The art is literally replete with various drive configurations and topologies suitable for use with the present invention. Accordingly, this block will not be discussed in any further detail.

Before proceeding with the detailed description of the invention referenced to the drawings, a general overview of the control established by the present invention will be set forth. To control stepper motor 12's rotational position, a VELOCITY signal is calculated by control 16 every Update Interval (2 milliseconds in a constructed embodiment). The VELOCITY signal represents the desired change in rotational position over the next Update Interval. Specifically, VELOCITY corresponds to the number of "microsteps" to take during the next Update Interval. This change in position is divided by a pre-determined number corresponding to the number of table entries in a transfer table, and is preferably 64 in a constructed embodiment. The result of the division is a Velocity Increment (VEL INC). The VEL INC is be used to generate position data every 31.25 microseconds (in a constructed embodiment—0.002/64) over the next Update Interval. In the constructed embodiment, each new VELOCITY signal is used to populate one of two 64 entry transfer tables by reading data from a function table (e.g., a sine wave or cosine wave) using the velocity increment to generate a table address to extract a data sample from the function table. After one of the transfer tables is populated, and at 31.25 microsecond intervals, a data word from the transfer table is written to the output port. The data at the output port pins are the current value signals. The transfer table address is incremented following each transfer in order to output the next table entry on the next transfer (31.25 microseconds later). After 64 transfers (2 milliseconds), the entire transfer table has been output, and at this point a software interrupt is generated. The interrupt code will cause a new VELOCITY signal value to be calculated, and with it, 64 new table entries are determined. There are two transfer tables. A first one of the tables is outputting data every 31.25 microseconds under control of a DMA controller, while the other is being loaded with 64 new words of data by the main control software. The roles of the two transfer tables are reversed every Update Interval by way of an interrupt. The transfer table most recently loaded will commence transferring its data to the output port following the next interrupt, while the transfer table presently accessed by the main control will be reloaded with new current values.

Figure 2:
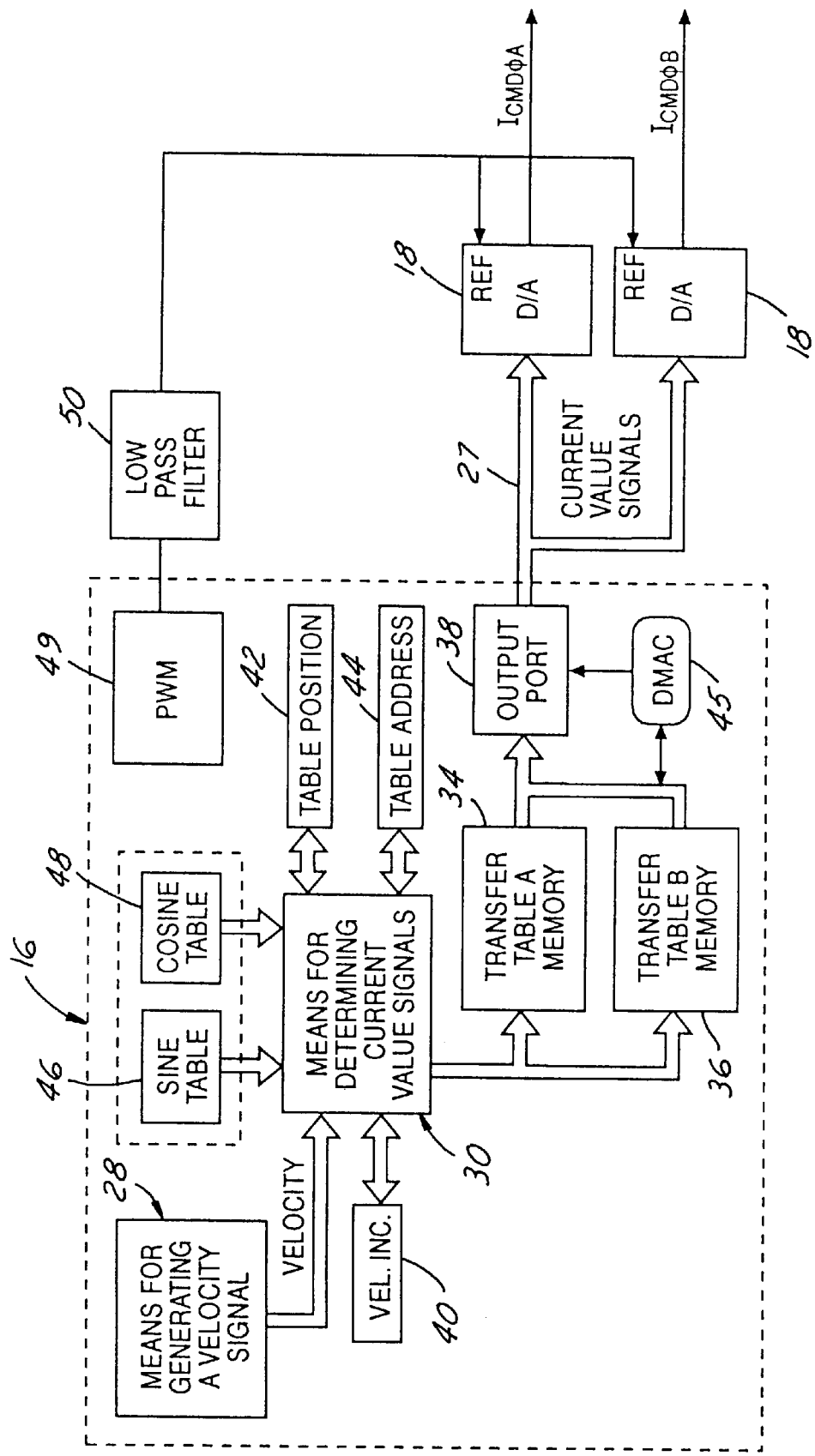
FIG. 2 is a simplified, schematic and block diagram view showing, in greater detail, the control means shown in block diagram form in FIG. 1.

Referring now to FIG. 2, control means 16 is shown in greater detail. Control means 16 includes means 28 for generating a velocity signal, means 30 for determining current value signals, a function table 32, a first transfer table 34, a second transfer table 36, an output port 38, a velocity increment memory 40, a transfer table position memory 42, a table address memory 44 and a direct memory access (DMA) controller (DMAC) 45.

Generating means 28 is preferably implemented in software by executing a sequence of pre-programmed steps stored in program memory of control means 16. The output signal from generating means 28, namely velocity signal VELOCITY, may be, and is in a constructed embodiment, a digital word indicative of a desired change in a rotational position of rotor 22 per unit time. In one embodiment, the VELOCITY signal count corresponds to the desired number of microsteps for rotor 22 to take during the next Update Interval. For example, assume that a full-step for motor 12 corresponds to the well-known 1.8° mechanical displacement of rotor 22. Further assume, in one configuration, that 64 microsteps per full-step is selected. Also assume that the Update Interval is 2 milliseconds. Based on the foregoing, a VELOCITY count of 640 corresponds to ten (10) full-steps per Update Interval, or, in other words, 18° mechanical per 2 milliseconds. This displacement per unit time corresponds to 1,500 revolutions per minute (rpm).

The determined value of the VELOCITY signal may be governed by (or constrained by) various system parameters such as the maximum velocity of rotor 22, the maximum (absolute, or Delta) acceleration of rotor 22, and/or the maximum (absolute or Delta) deceleration of rotor 22. These and other governing parameters are well understood in the art. Accordingly, a VELOCITY signal generation program may be implemented by no more than routine application of ordinary programming skills.

Figure 6:
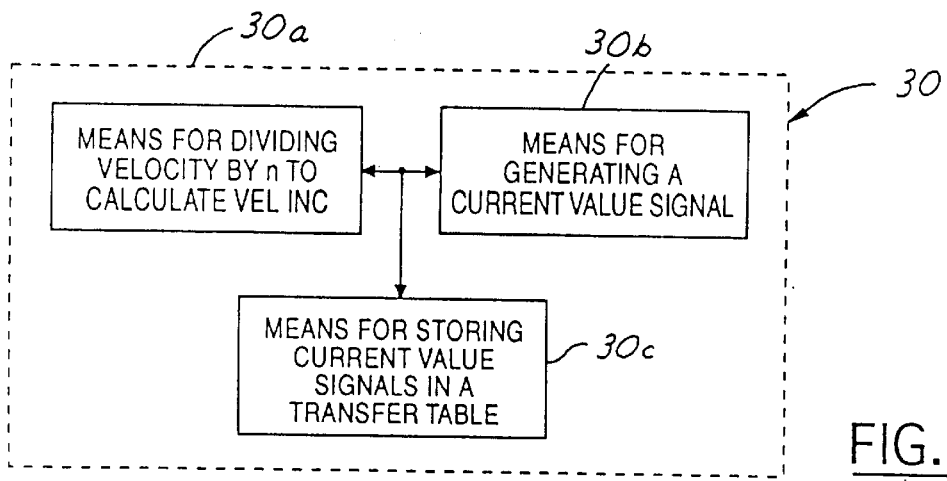
FIG. 6 shows the current value determining means 30 of FIG. 2 in greater detail.

Determining means 30 is also preferably implemented in software by execution of a pre-programmed sequence of program steps stored in program memory of control means 16. Block 30 includes means 30a (see FIG. 6) for dividing the VELOCITY signal (i.e., a count corresponding to the change in rotational position of rotor 22) into a pre-determined number in increments. In a preferred embodiment, the pre-determined number of increments is 64. In an alternative embodiment, the pre-determined number of increments is 48. This pre-determined number corresponds to the number of table entries in tables 34, and 36 (more of which will be described below). Block 30 also includes means 30b (see FIG. 6) for generating a current value signal using the function table 32 in coordination with the first predetermined number of increments (i.e., the plurality of values assigned to the VEL INC parameter— how this value is processed is described below). The VEL INC parameter is valid for one Update Interval (2 milliseconds in a constructed embodiment), at which point it will be updated in accordance with the updated VELOCITY signal value. That is, a VEL INC parameter value is the change in motor position in 0.002/64 seconds in the constructed embodiment. Block 30 further includes means 30c (see FIG. 6) for storing the current value signal as calculated (i.e., a sequence of digital words) in one of the transfer tables 34 and 36.

In addition to the VEL INC parameter, the means for generating the current value signal 27 included in block 30 makes use of a table position parameter stored in memory 42, as well as a table address parameter stored in memory 44. The table position parameter is preferably a running sum of the VEL INC parameter (summed on a per table entry basis). The table address parameter is derived from the table position parameter, and, in a preferred embodiment, the lowermost 8-bits of the whole number portion of the table position parameter. The Table Position parameter is used to keep track from where in the function table 32 the last data point was taken. This is specifically needed to maintain continuity in the output current wave commands.

Function table 32 comprises, in a preferred, two-phase stepper motor embodiment, a sine law function table 46, and a cosine law function table 48. In a constructed embodiment, tables 46 and 48 each contain 256 evenly spaced points corresponding to the magnitude of a sine wave, and a cosine wave, respectively, each having a duration of one (1) cycle (360°). Each point is, in a constructed embodiment, 8-bits wide. It should be appreciated that tables 46 and 48 may be implemented using a data memory of control means 16, such as, for example, a non-volatile memory. In addition, it should be appreciated that tables 46 and 48 may contain data corresponding to functions other than a pure sine and cosine waveforms, respectively, as necessary to more effectively drive motor 12. For example, a third harmonic may be added to each one of the sine and cosine functions as expressed in the respective wave tables 46 and 48, or, distortion may be added for improved motor smoothness. Alternatively, a "triangle" waveform may be desirable under certain circumstances known to those in the art.

DMAC 45 may be programmed to perform a data transfer cycle without any further intervention by the main processing core of control means 16. In particular, DMAC 45 may be programmed with parameters such as a source address (e.g., the starting address of transfer table 34 and/or transfer table 36), a destination address (e.g., address of output port 38), and a type of transfer mode (e.g., I/O mode, etc.).

With continued reference to FIG. 2, control means 16 may also include a pulse width modulator (PWM) 49, which may be configured to produce a relatively high frequency pulse train, digital in nature, and whose duty cycle may be selectable. In addition, a low pass filter 50 may be provided in the present invention (and which may be external to the microcontroller actually used in a constructed embodiment of control means 16). The low pass filter 50 is configured to extract the average value (i.e., DC value) of the digital pulse train generated by PWM 49. The resultant average value, shown as the REFERENCE signal in FIGS. 1 and 2, is then applied to the reference input terminals of D/A's 18. As mentioned above, the REFERENCE signal applied to D/A's 18 sets the full scale magnitude of the current command signals. That is, the D/A's 18 are of the multiplying type in which the output signal (i.e., the $I_{CMD\phi A}$ and $I_{CMD\phi B}$ signals), are the product of the reference signal, and the digital code input, namely, the current value signal 27.

Figure 3:
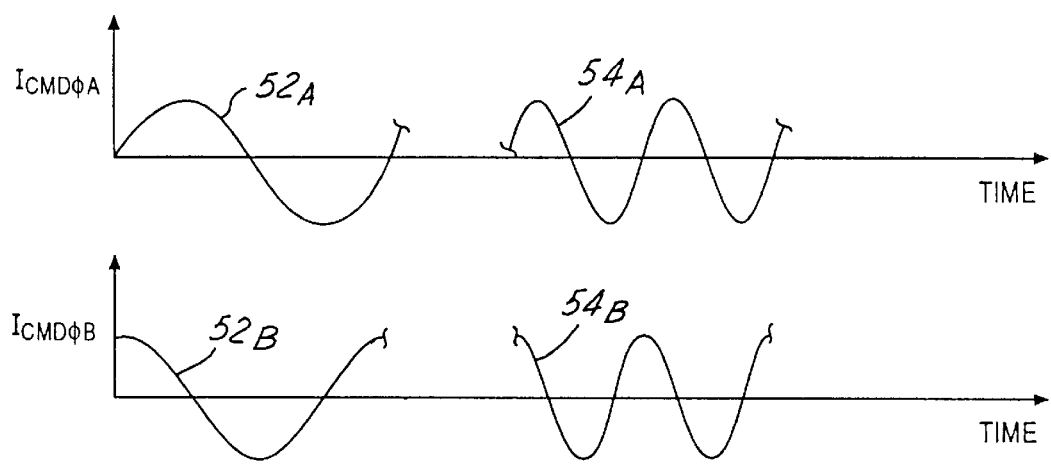
FIGS. 3 shows exemplary waveforms generated by the control circuit according to the present invention.

FIG. 3 shows a sample output from D/A's 18 corresponding to the current command signals $I_{CMD\phi A}$ and $I_{CMD\phi B}$ (smoothed for illustration purposes). Waveforms 52$_A$, and 52$_B$, show sine and cosine waveforms, respectively, having a first frequency. Traces 54$_A$, and 54$_B$, show sine, and cosine waveforms having a second frequency approximately twice that of the first frequency. It will be understood that traces 54$_A$, and 54$_B$ will cause motor 12 to rotate faster than traces 52$_A$, and 52$_B$.

Figure 4:
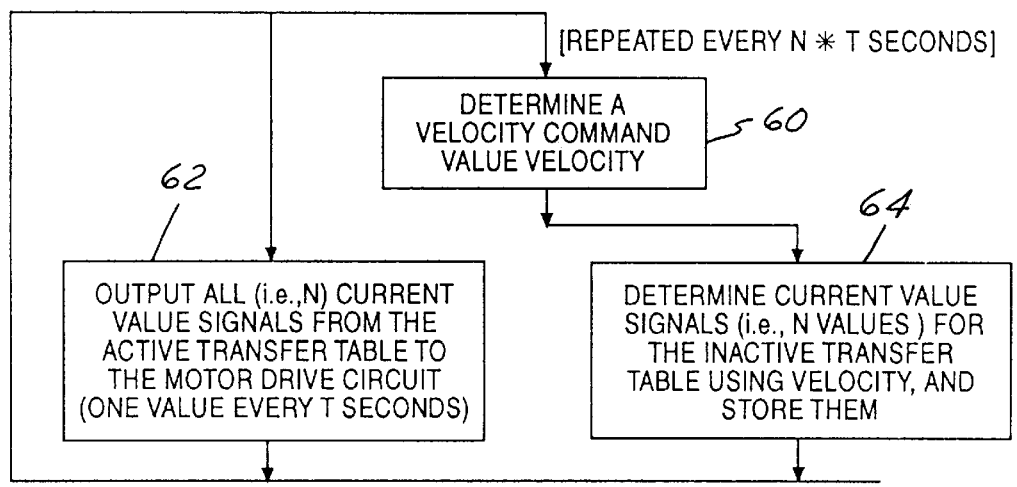
FIG. 4 is a simplified flow chart diagram showing the overall methodology of the present invention.

FIG. 4 is a flow chart diagram illustrating the basic control established by the present invention.

Steps 60 and 64 are performed on a periodic basis every Update Interval (i.e., every N* T seconds, where N equals the size of the transfer tables 34 or 36, and T is the interval at which new current value signals 27 are transferred to the output port).

Steps 62 and 60, 64 are preferably performed in parallel to some degree. That is, performance of steps 62 and 64 overlap by a predetermined amount. The performance of step 62 is controlled in large part by DMAC 45 (and is transparent to the software executing on control means 16). Performance of step 64 is controlled by execution of software corresponding to block 30 by the processing core of control means 16.

Step 62 is performed on a periodic basis as determined, preferably, by a programmable timer (not shown) portion of control means 16. Each time the timer times out (i.e., T seconds, or 0.002/64 seconds in the constructed embodiment), an interrupt is generated. The interrupt causes DMAC 45 to read a current value signal 27 from the active transfer table and output it to the output port, which is coupled to the motor drive circuit comprising D/A's 18 and circuit 20. Specifically, this step involves setting up the DMAC 45 (as described above) and then activating the DMAC 45 for a data transfer cycle. Then, every T seconds (Update Interval (as defined above) /N seconds, where N equals the number of transfer table entries), another digital word is retrieved by the DMAC 45 from the active transfer table (either 34 or 36). Preferably, the digital word is 16-bits wide, 8-bits for each motor phase. The retrieved, digital current value signals 27 are then applied to the D/A's 18—one 8-bit word to each D/A 18. The D/A's 18 respond by generating the current command signals $I_{CMD\phi A}$ and $I_{CMD\phi B}$, which are applied to drive circuit 20. Drive circuit 20 generates excitation signals which are applied to motor 12 to thereby generate currents $I_{\phi A}$ and $I_{\phi B}$. When the last table entry has been written to the output port 38 (i.e., the transfer table has been completely written to the output port), an interrupt (software) is generated, causing the main program to switch the active/inactive states of the tables 34, 36. That is, the main software routine is programmed to respond to the software interrupt by changing the status of the transfer tables. Of course, the previously inactive transfer table has been filled with new data and is now ready to be output.

At this point, with the DMAC 45 commencing its job of writing out the data in the now active transfer table, the main software routine executing on control means 16 again performs steps 60 and 64. In step 60, a VELOCITY command signal is calculated by means 28, as described above. In step 64, updated current value signals for the (presently) inactive transfer table are determined using the updated velocity signal VELOCITY, and are stored therein. The major loop comprising steps 60 and 64 is repeated every Update Interval, which may be 2 milliseconds in a constructed embodiment. As the major loop repeats, the active, and inactive status of the two transfer tables are switched, and a new or updated velocity signal VELOCITY is calculated, which results in updated current value signals 27 being generated by execution of software corresponding to block 30.

Figure 5:
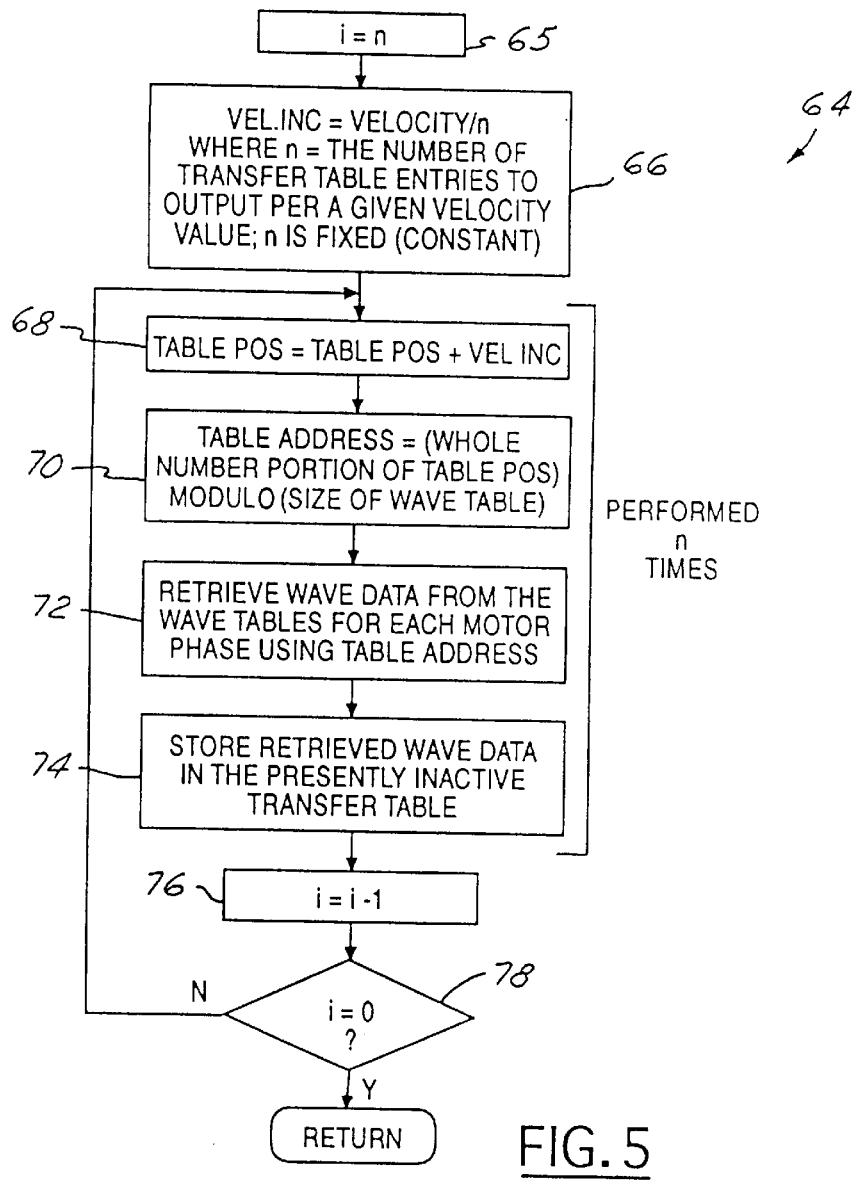
FIG. 5 shows, in greater detail, the general step of determining current value signals for an inactive transfer table, shown in block diagram form in FIG. 4.

FIG. 5 is a flow chart diagram showing, in greater detail, the steps involved in determining updated current value signals.

In step 66, a new value for the velocity increment parameter VEL INC is generated. The details of this step are described above. The VEL INC parameter essentially controls how far apart samples are taken from the function tables 46 and 48. For example, assume that VEL INC equals 8. Since the length of tables 46 and 48 is 256, and 64 samples are to be taken therefrom (in the preferred embodiment to populate tables 34 and 36), the sampling will cause the function tables to be traversed twice (sampling in the tables 46 and 48 "wraps around"). Assuming tables 46, 48 contain one full cycle according to the sine or cosine law, the foregoing results in populating one of transfer tables 34, 36 with data corresponding to two (2) full cycles of a sine or cosine waveform. Alternatively, were VEL INC equal to four (4), function tables 46, 48 would be traversed only once in populating the 64 entry transfer table so that the transfer table contains data corresponding to only one full cycle. Alternatively, if VEL INC equals 16, then the function tables 46, 48 (in the constructed embodiment) would be traversed four (4) times, and the resulting 64 entry transfer table would contain four (4) full cycles of a sine or cosine wave. It should be understood that since the data contained in the transfer table (34, 36) is output during a fixed time interval ("Update Interval"), outputting a higher number of cycles causes the frequency of the resulting current command signal $I_{CMD\phi A}$ (or $I_{CMD\phi B}$) to also increase, thereby increasing the speed of rotation of rotor 22 of motor 12.

Thus, the step of generating a digital current value signal 27 involves the substeps of generating a first sequence of 8-bit digital words corresponding to a sine law function (using sine table 46), generating a second sequence of 8-bit digital words corresponding to a cosine law function (using cosine table 48), and combining respective 8-bit digital words from each sequence to form a third sequence of 16-bit digital words. The third sequence corresponds to the current value signals 27. In a constructed embodiment, the wave tables 46 and 48 are but one table—16 bits wide, eight (8) bits for the sine function, and eight (8) bits for the cosine function. The sine and cosine values are thus transferred simultaneously from the wave table 46/48 to the transfer table (either 34 or 36). The 16 bit word is then sent to the output port 38 under the direction of DMAC 45. The output port 38 splits or segregates its 16 bit output into 2 groups of 8 bits, which are then respectively coupled to the two (2) D/A's 18.

It should also be appreciated that since, in the constructed embodiment, a sine law type waveform is used to drive one motor winding while a cosine law type waveform is used to drive the other motor winding, that the two windings are out of phase. In other words, it may be said that the sine wave "lags" the cosine wave. This relationship results in the rotor 22 rotating in one of either a clockwise (CW) or counter-clockwise (CCW) direction depending on the configuration. Switching the sine/cosine waveforms applied to the two motor phases would cause the rotor 22 to rotate in the opposite direction. The present invention implements direction control by merely making the VELOCITY signal either a positive or negative number. With a positive number, the VEL INC parameter value is also positive, so that data is extracted from the sine and cosine tables 46, 48 in a forward direction. When the VEL INC parameter is negative, data is extracted from the tables 46, 48 in a backwards or reverse orientation. This, in effect, causes the lead-lag relationship between the motor phases to be reversed, thus also reversing the direction of rotation of the rotor 22.

With continued reference to FIG. 5, in step 68, the table position parameter is updated. As indicated above, the TABLEPOS parameter is indicative of the running sum of the velocity increment VEL INC parameter (summed on a per table entry basis).

In step 70, a table address parameter value is determined. The table address may be determined as: (whole number portion of TABLEPOS) modulo (size of the wave table 46/48). In implementation, the evaluation of the modulo function is relatively straightforward when the wave table 46/48 size is a power of 2. In the constructed embodiment, the table address parameter value comprises the lowermost 8-bits of the whole number portion of the TABLEPOS parameter. This is an integer value which may be used as an index into the sine and cosine wave tables 46, and 48 in the preferred embodiment.

In step 72, one 16 bit data sample is retrieved from waveform tables 46 and 48 using the table address parameter value as determined in step 70.

In step 74, the wave data for the motor phases is stored in the presently inactive transfer table.

In step 76, a counter is decremented controlling the iteration of steps 68–74, which must be repeated a sufficient number of times to completely populate the inactive transfer table.

In step 78, a comparison is made to determine whether the inactive transfer table has been completely populated with wave data corresponding to the recently calculated current value signals.

It should be appreciated that illustration of steps 76 and 78 and usage of the variable n is exemplary only to indicate that steps 68–74 are repeated n times to fully populate the inactive transfer table having n-entries. Of course, in any particular implementation, there are a plurality of techniques well-known to those of ordinary skill in the programming arts, to effect repeated operation of a defined sequence of steps.

EXAMPLE

Assume that the VELOCITY signal is the number of microsteps (to be taken by motor 12) per Update Interval (the Update Interval being arbitrarily selected as 2 milliseconds in a constructed embodiment). Further, assume that VELOCITY is equal to 300. The velocity increment parameter VEL INC is then calculated as: VELOCITY divided by 64. The velocity increment VEL INC is thus equal to 4.6875. The table position parameter value may be, and is in the preferred embodiment, the running sum of the velocity increment parameter VEL INC. The table address is the lowermost 8-bits of the whole number portion of the table address parameter. Table 1 below shows the progression of the above-identified parameters.

into the function waveform tables 46, 48). It should be appreciated that the fractional portion of VEL INC, when accumulated over several summations, can affect the whole number portion and therefore is preferably taken into account. Further, it should be appreciated that motor 12 should be driven with substantially continuous waveforms (i.e., to avoid severe discontinuities). This is why the running total of the VEL INC parameter is maintained, so that when the next transfer table is populated, the control program will know where in the sine and/or cosine tables 46, 48 the sampling left off, and from where to resume sampling so that transfer table-to-transfer table continuity is maintained.

Since Control 16 is implemented using a single chip microprocessor, less hardware is required than conventional approaches. Further, software control enables varying the magnitude of certain parameters (e.g., current command magnitude) without the need for dip switches, which can be cumbersome to use. In particular, in a preferred embodiment, the output of PWM 49 of the processor may be used to control the current magnitude.

While the invention has been particularly shown and described with reference to a preferred embodiment thereof, it is well understood by those skilled in the art that various changes and modifications can be made in the invention without departing from the spirit and scope thereof.

TABLE 1

VEL = 300

| Transfer Table Entry No. | VEL INC (Binary) | Table Position (TablePos) 0.0 | Whole No. Portion of TablePos (Binary) | Table Address |
|---|---|---|---|---|
| 1 | 100.101100 | 0000 00000100.101100 | 0000 0000 0100 | 4 |
| 2 | 100.101100 | 0000 00001001.011000 | 0000 0000 1001 | 9 |
| 3 | 100.101100 | 0000 00001110.000100 | 0000 0000 1110 | 14 |
| . | | | | |
| . | | | | |
| . | | | | |
| 63 | 100.101100 | 0001 00100111.010100 | 0001 0010 0111 | 39 |
| 64 | 100.101100 | 0001 00101100.000000 | 0001 0010 1100 | 44 |

Further assume that a new value for the velocity signal VELOCITY is generated and is equal to 304. The new velocity increment parameter VEL INC is thus 4.75, and Table 2 below further illustrates the continued progression of the above-identified operating parameters.

TABLE 2

VEL = 304

| Transfer Table Entry No. | VEL INC (Binary) | Table Position (TablePos) | Whole No. Portion of TablePos (Binary) | Table Address |
|---|---|---|---|---|
| 1 | 100.110000 | 0001 00110000.110000 | 0001 00110000 | 48 |
| 2 | 100.110000 | 0001 00110101.100000 | 0001 00110101 | 53 |
| 3 | 100.110000 | 0001 00111010.010000 | 0001 0011 1010 | 58 |
| . | | | | |
| . | | | | |
| . | | | | |
| 63 | 100.110000 | 0010 01010111.010000 | 0010 01010111 | 87 |
| 64 | 100.110000 | 0010 01011100.000000 | 0010 01011100 | 92 |

The velocity increment parameter VEL INC is held, in a constructed embodiment, as is the Table Position parameter TABLEPOS, as a binary number having a whole number portion and a fractional portion, to maintain accuracy (even though only the whole number portion is used as an index

I claim:

1. A method of controlling a stepper motor, said method comprising the steps of:

(A) generating a first velocity signal indicative of a desired change in a rotational position of said motor per unit time;

(B) dividing said change in said rotational position into a first predetermined number of increments;

(C) generating a first current value signal using said first predetermined number of increments and at least one function table; and, (D) storing said first current value signal in a first transfer table.

2. The method of claim 1 further including the step of:

retrieving said first current value signal from said first transfer table; and, generating a first current said motor using said retrieved first current value signal.

3. The method of claim 2 wherein said first current value signal is in a digital format and said generating a first current step includes the substeps of:

generating a first current command signal using said retrieved, digital format first current value signal;

applying said first current command signal to a drive circuit to generate excitations signals; and, applying said excitation signals to said motor.

4. The method of claim 2 further including the steps of:

generating a second velocity signal;

dividing a change in rotational position of said motor associated with said second velocity signal into a second predetermined number of increments;

generating a second current value signal using said second predetermined number of increments and said at least one function table;

storing said second current value signal in a second transfer table;

wherein performance of said steps of generating a second current value signal and storing said second current value signal steps, and said step of retrieving, overlap by a predetermined amount.

5. The method of claim 1 wherein said stepper motor is a two-phase motor and wherein said first current value signal comprises a first sequence of digital words corresponding to a sine law function and a second sequence of digital words corresponding to a cosine law function.

6. The method of claim 1 wherein said change in rotational position corresponds to the number of microsteps per unit time.

7. A method of generating direct current command signals to a drive circuit for a stepper motor for controlling the velocity thereof, said method comprising the steps of:

(A) generating a first velocity signal indicative of a first desired change in a rotational position of said motor per unit time;

(B) dividing said first change in rotational position into a first predetermined number of increments;

(C) generating a first current value signal using said first predetermined number of increments and a function table;

(D) storing said first current value signal in a first transfer table;

(E) generating a second velocity signal indicative of a second desired change in the rotational position of said motor per unit time;

(F) dividing said second change in rotational position into a second predetermined number of increments;

(G) generating a second current value signal using said second predetermined number of increments and said function tables;

(H) storing said second current value signal in a second transfer table;

(I) retrieving said first current value signal from said first transfer table; and, (J) applying said retrieved first current value signal to said drive circuit to thereby energize said motor wherein performance of steps (H) and (I) overlap.

8. The method of claim 7 wherein said motor is a two-phase motor and said function table comprises a sine law function table and cosine law function table, and wherein step (C) comprises the substeps of:

generating a first sequence of digital words corresponding to a sine law function using said sine law function table; and generating a second sequence of digital words corresponding to a cosine law function using said cosine law table;

wherein said first current value signal comprises said first and said second sequences.

9. An apparatus for controlling a stepper motor comprising:

means for generating a first velocity signal indicative of a desired change in a rotational position of said motor per unit time;

means for dividing said change in said rotational position into a first predetermined number of increments;

means for generating a first current value signal using said first predetermined number of increments and at least one function table; and, means for storing said first current value signal in a first transfer table.

10. The apparatus of claim 9 further including:

means for retrieving said first current value signal from said first transfer table; and, means for generating a first current in said motor using said retrieved first current value signal.

11. The apparatus of claim 10 wherein said first current value signal is in a digital format and said first current generating means includes:

means for generating a first current command signal using said retrieved, digital format first current value signal;

means for generating excitations signals using said first current command signals to thereby cause said first current to flow.

12. The apparatus of claim 11 further including:

means for generating a second velocity signal;

means for dividing a change in rotational position of said motor associated with said second velocity signal into a second predetermined number of increments;

means for generating a second current value signal using said second predetermined number of increments and said at least one function table;

means for storing said second current value signal in a second transfer table;

wherein said storage of said second current value signal and said retrieval of said first current value signal overlap by a predetermined amount.

13. The apparatus of claim 10 wherein said first current value signal comprises a first sequence of digital words corresponding to a sine law function and a second sequence of digital words corresponding to a cosine law function.

14. The apparatus of claim 10 wherein said change in rotational position corresponds to the number of microsteps per unit time.

* * * * *